(12) United States Patent
McCollum et al.

(10) Patent No.: US 7,497,935 B2
(45) Date of Patent: *Mar. 3, 2009

(54) ELECTRODEPOSITABLE COATING COMPOSITIONS AND METHODS RELATED THERETO

(75) Inventors: Gregory J. McCollum, Gibsonia, PA (US); Geoffrey R. Webster, Jr., Gibsonia, PA (US); Michael L. White, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 781 days.

This patent is subject to a terminal disclaimer.

(21) Appl. No.: 10/928,770

(22) Filed: Aug. 27, 2004

(65) Prior Publication Data

US 2006/0042949 A1     Mar. 2, 2006

(51) Int. Cl.
*C25D 13/06*     (2006.01)

(52) U.S. Cl. .................. 204/489; 204/493; 204/505; 523/415

(58) Field of Classification Search ............... 204/486, 204/492–509, 489; 523/415
See application file for complete search history.

(56) References Cited

U.S. PATENT DOCUMENTS

| | | | |
|---|---|---|---|
| 3,954,587 A | 5/1976 | Kokawa | 204/181 |
| 3,960,688 A | 6/1976 | Calbo, Jr. | 204/181 |
| 4,719,036 A * | 1/1988 | Clubley et al. | 252/391 |
| 5,021,135 A | 6/1991 | Wilson et al. | 204/180.8 |
| 6,368,719 B1 * | 4/2002 | Siever et al. | 428/457 |
| 7,070,683 B2 * | 7/2006 | Peffer et al. | 204/500 |
| 2002/0161154 A1 | 10/2002 | Cattron et al. | 526/304 |

FOREIGN PATENT DOCUMENTS

| | | |
|---|---|---|
| DE | 31 24 295 | 1/1983 |
| DE | 41 37 420 A1 | 5/1993 |
| EP | 0 170 063 | 8/1988 |
| WO | WO 01/19837 | 12/1991 |
| WO | WO 91/19837 | * 12/1991 |
| WO | WO 02/36673 | 5/2002 |
| WO | WO 2004/072191 A2 | 8/2004 |

OTHER PUBLICATIONS

"New Antioxidant/Metal Deactivator System for Polyolefins Used in Wire and Cable Applications",—Technical Papers—by DiBattista et al., Society of Plastics Engineers (1975), 21, pp. 280-282.
"Copper Deactivators for Polyolefin Insulation", by M.G. Chan et al, Proc. Int. Wire Cable Symp. 27, 1978, pp. 99-106.

* cited by examiner

*Primary Examiner*—Kishor Mayekar
(74) *Attorney, Agent, or Firm*—Robert A. Diaz

(57) ABSTRACT

The invention provides a curable electrodepositable coating composition that has improved durability in the presence of metal ions. The coating composition includes one or more ungelled, active hydrogen-containing ionic salt group-containing resins which are electrodepositable on an electrode, one or more curing agents, and one or more metal deactivators.

56 Claims, No Drawings

ELECTRODEPOSITABLE COATING COMPOSITIONS AND METHODS RELATED THERETO

FIELD OF THE INVENTION

The present invention is directed to an electrodepositable coating composition and a process for coating an electroconductive substrate using the composition.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece to be coated serving as the anode. This was familiarly referred to as anionic electrodeposition. However, in 1972 cationic electrodeposition was introduced commercially and has continued to gain in popularity. Today, cationic electrodeposition is by far the prevalent method of electrodeposition. For example, a cationic primer coating is applied by electrodeposition to more that 80 percent of all motor vehicles produced throughout the world.

Many industrial applications utilize electrodepositable acrylic coatings, crosslinked with aliphatic isocyanates. Acrylic coatings are typically more stable to ultraviolet radiation-induced degradation than their epoxy-based counterparts. Such coatings are frequently used in one-coat applications, or in conjunction with a clear topcoat. Electrodepositable primer coating compositions, particularly those used in the automotive industry, typically are corrosion-resistant epoxy-based compositions crosslinked with aromatic isocyanates. If exposed to ultraviolet energy, such as sunlight, these compositions can undergo photodegradation. In most applications, a primer-surfacer is spray-applied directly to the cured electrodeposited coating prior to application of one or more topcoats. The primer-surfacer can provide a variety of properties to the coating system, including protection of the electrodeposited coating from photodegradation. Alternatively, one or more topcoats can be applied directly to the cured electrodeposited coating and in such instances, these topcoats typically are formulated such that the topcoat(s) provide sufficient protection to prevent photodegradation of the electrodeposited primer coating. If the topcoat(s) do not provide sufficient protection, photodegradation of the electrodeposited primer coating can result in delamination of the subsequently applied topcoats from the cured electrodeposited primer coatings producing catastrophic failure of the cured coating system.

The presence of metal salts, in particular iron salts, in an electrodeposition bath is known to have a detrimental effect on the durability of an electrodeposited coating. Iron ions are commonly found in electrodeposition baths that are in contact with ferrous materials. Common sources of iron contamination include fallen metal substrate in the tank, weld splatter, metal flakes and dust from grinding of the metal part prior to electrodeposition, pretreatment chemical carryover, pump housings, and pipes, among other sources.

Attempts to reduce or eliminate metal ions, particularly iron, in an electrodeposition bath have been reported in the art. One method involves addition of an iron chelator to an affected electrodeposition bath. The chelator is chosen such that it forms water-soluble complexes with iron ions or heavy metal ions in general, which are then physically removed from the bath by ultrafiltration. One difficulty with this approach is that many chelators that form soluble complexes are also agressive toward dissolution of the substrate being coated, thus requiring very strict control of the level of chelator present as well as timely removal of resultant complexes from the electrodeposition bath.

Also known in the art is an electrodepositable coating composition comprising an iron ionization-inhibitor, which may assist in the maintenance of an acceptable level of iron by reducing the rate of dissolution of metallic iron. Compounds can be included in an electrodepositable bath composition which either inhibit dissolution or passivate the surface of the metallic substrate.

The aforementioned prior art addresses methods to remove metal ions from, or reduce the amount of metal ions introduced into an electrodeposition paint bath. The described methods require careful monitoring and control of additives intended to remove the metal ions. There remains a need in the coatings industry for a method to control the deleterious effect of metal ions with minimal maintenance.

SUMMARY OF THE INVENTION

In one embodiment, the present invention is directed to a curable electrodepositable coating composition that has improved durability in the presence of metal ions. The coating composition comprises a resinous phase dispersed in an aqueous medium. The resinous phase comprises: (a) one or more ungelled, active hydrogen-containing ionic salt group-containing resins which are electrodepositable on an electrode; (b) one or more curing agents; and (c) one or more metal deactivators.

In another embodiment, the present invention is directed to a process for coating an electroconductive substrate. The process comprises the following steps: (a) electrophoretically depositing on the substrate a curable electrodepositable coating composition to form an electrodeposited coating over at least a portion of the substrate; and (b) heating the coated substrate of step (a) to a temperature and for a time sufficient to cure the electrodeposited coating on the substrate. The electrodepositable coating composition comprises a resinous phase dispersed in an aqueous medium. The resinous phase comprises: (i) one or more ungelled, active hydrogen-containing ionic salt group-containing resins which are electrodepositable on an electrode; (ii) one or more curing agents; and one or more metal deactivators.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As mentioned above, in one embodiment the present invention is directed to a curable electrodepositable coating composition that has improved durability in the presence of metal ions. The coating composition comprises a resinous phase dispersed in an aqueous medium. The resinous phase comprises: (a) one or more ungelled, active hydrogen-containing ionic salt group-containing resins which are electrodepositable on an electrode; (b) one or more curing agents; and (c) one or more metal deactivators. By "ungelled" is meant the resins are substantially free of crosslinking and have an intrinsic viscosity when dissolved in a suitable solvent, as determined, for example, in accordance with ASTM-D1795 or ASTM-D4243. The intrinsic viscosity of the resin is an indication of its molecular weight. A gelled resin, on the other hand, since it is of essentially infinitely high molecular weight, will have an intrinsic viscosity too high to measure. As used herein, a resin (or polymer) that is "substantially free of crosslinking" refers to a reaction product that has a weight average molecular weight (Mw), as determined by gel permeation chromatography, of less than 1,000,000.

Also, as used herein, the term "polymer" is meant to refer to oligomers and both homopolymers and copolymers. Unless stated otherwise, as used in the specification and the claims, molecular weights are number average molecular weights for polymeric materials indicated as "Mn" and obtained by gel permeation chromatography using polystyrene standards in an art-recognized manner.

Ionic salt group-containing polymers suitable for use in the electrodepositable coating compositions, typically as the main film-forming polymer, can include any of a number of ionic group-containing polymers so long as the polymers are "water dispersible," i.e., adapted to be solubilized, dispersed or emulsified in water. Such polymers comprise ionic functional groups to impart either a positive or a negative charge. In one embodiment the ionic resin (a) comprises cationic salt groups. In an alternate embodiment, the ionic resin (a) comprises anionic salt groups. Examples of suitable cationic groups include amine salts, quaternary ammonium salts and sulfonium salts. Suitable anionic groups include carboxylate salts and phosphate salts.

Suitable examples of ionic film-forming resins can include active hydrogen-containing, ionic polymers selected from one or more of a polyepoxide polymer, a polyester polymer, a urethane polymer, a polyether polymer, a polyurea polymer, a vinyl polymer, a polyamide polymer, a polyimide polymer, mixtures thereof and copolymers thereof, for example a polyester-polyurethane polymer. Typically, the resin (a) comprises a polyepoxide polymer, a vinyl polymer, or a mixture of a polyepoxide polymer and a vinyl polymer. As aforementioned, the polymers which are suitable for use as the ionic resin (a), comprise active hydrogens as curing reaction sites. The term "active hydrogen" refers to those groups which are reactive with isocyanates as determined by the Zerewitnoff test as is described in the JOURNAL OF THE AMERICAN CHEMICAL SOCIETY, Vol. 49, page 3181 (1927). In one embodiment of the present invention, the active hydrogens are derived from hydroxyl groups, primary amine groups and/or secondary amine groups.

Any of a variety of polyepoxides known in the related art can be used to form the ionic resin (a). The polyepoxide can be aromatic, araliphatic or aliphatic in nature. The polyepoxides which are used in the practice of the invention are polymers having a 1,2-epoxy equivalency greater than one and preferably at least two, that is, polyepoxides which have on an average basis at least two epoxy groups per molecule. Suitable polyepoxides include polyglycidyl ethers of cyclic polyols, and polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl) methane or the like.

Besides polyhydric phenols, other cyclic polyols can be used in preparing the polyglycidyl ethers of cyclic polyol derivatives. Examples of other cyclic polyols would include alicyclic polyols, particularly cycloaliphatic polyols, such as 1,2-cyclohexanediol, 1,4-cyclohexanediol, 1,2-bis-(hydroxymethyl)cyclohexane, 1,3-bis-(hydroxymethyl)cyclohexane and hydrogenated bisphenol A.

Also suitable are polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like. Another class of polyepoxides are those containing oxyalkylene, or polyether, groups in the epoxy molecule, such as those described in U.S. Pat. Nos. 4,001,101 and 4,001,156.

In one embodiment, the polyepoxide resin is anionic. Examples of film-forming resins suitable for use in anionic electrodeposition bath compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable electrodepositable resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference. Other acid functional polymers can also be used such as phosphatized polyepoxide or phosphatized acrylic polymers as are well known to those skilled in the art.

In an alternate embodiment, the polyepoxide resin is cationic. Suitable examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Also suitable are sulfonium salt group-containing resins, such as those described in U.S. Pat. No. 3,793,278. Additional polyepoxide resins which are suitable for use in forming the cationic resin (a) include those described in U.S. Pat. Nos. 4,755,418, 5,948,229 and 6,017,432.

Besides amine salt and sulfonium group-containing resins, quaternary ammonium salt group-containing resins can also be employed. Examples of these resins are those which are formed from reacting an organic polyepoxide with a tertiary amine salt. Such resins are described in U.S. Pat. Nos. 3,962, 165; 3,975,346; and 4,001,101. In one embodiment, the polyepoxide is an aromatic polyepoxide comprising amine salt groups. In an alternate embodiment, the polyepoxide is an aromatic polyepoxide comprising sulfonium salt groups.

Suitable vinyl polymers from which the active hydrogen-containing, ionic salt group-containing polymer may be derived can include copolymers of one or more vinyl monomers, such as alkyl esters of acrylic acid or methacrylic acid, optionally, together with one or more other polymerizable ethylenically unsaturated monomers, including vinyl monomers described immediately below. Suitable vinyl monomers include alkyl esters of acrylic acid or methacrylic acid, such as methyl methacrylate, ethyl methacrylate, butyl methacrylate, ethyl acrylate, butyl acrylate, and 2-ethyl hexyl acrylate. One skilled in the art would recognize that in the case of an anionic salt group-containing resin, acrylic acid and methacrylic acid would also be suitable monomers. Other suitable vinyl monomers include copolymerizable, ethylenically unsaturated monomers such as nitriles such as acrylonitrile and methacrylonitrile, vinyl and vinylidene halides such as vinyl chloride and vinylidene fluoride, α-olefins such as isobutylene and 1-octene, and vinyl esters such as vinyl acetate. Acid and anhydride functional ethylenically unsaturated monomers such as acrylic acid, methacrylic acid or anhydride, itaconic acid, maleic acid or anhydride, or fumaric acid may be used. Amide functional monomers including acrylamide, methacrylamide, and N-alkyl substituted (meth) acrylamides are also suitable. Vinyl aromatic compounds such as styrene and vinyl toluene can be used so long as photodegradation resistance of the polymer and the resulting electrodeposited coating is not compromised.

Functional groups such as hydroxyl and amino groups can be incorporated into the vinyl polymer by using functional monomers such as hydroxyalkyl acrylates and methacrylates or aminoalkyl acrylates and methacrylates. One skilled in the art would recognize that amino groups would be limited to use in cationic resins. Epoxide functional groups (for conversion to cationic salt groups) may be incorporated into the acrylic polymer by using functional monomers such as glycidyl acrylate and methacrylate, 3,4-epoxycyclohexylmethyl (meth)acrylate, 2-(3,4-epoxycyclohexyl)ethyl(meth) acrylate, or allyl glycidyl ether. Alternatively, epoxide functional groups may be incorporated into the vinyl polymer by reacting carboxyl groups on the vinyl polymer with an epihalohydrin or dihalohydrin such as epichlorohydrin or dichlorohydrin. Examples of suitable film-forming vinyl resins (also referred to herein as "acrylic" polymers or resins) are described in U.S. Pat. Nos. 3,455,806 and 3,928,157. Sulfonium groups may be formed by the reaction of a sulfide with an epoxy group in the presence of acid, such as described in U.S. Pat. No. 4,083,232. In a particular embodiment, the polymer is a vinyl polymer comprising amine salt groups. In another embodiment, the polymer is a vinyl polymer comprising sulfonium salt groups.

The vinyl polymer can alternatively comprise anionic salt groups. In one embodiment, the polymer is a vinyl polymer comprising carboxylate salt groups. In another embodiment, the polymer is a vinyl polymer comprising phosphate salt groups.

Polyurethanes can also be used as the polymer from which the active hydrogen-containing, ionic salt group-containing resin can be derived. Among the polyurethanes which can be used are polymeric polyurethanes which can be prepared by reacting polyester polyols, polyether polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed below for use in the preparation of the polyester may also be used in place of or in combination with the polymeric polyols.

Additional examples of polyurethane polymers suitable for forming the active hydrogen-containing, ionic salt group-containing resin (a) include the polyurethane, polyurea, and poly(urethane-urea) polymers prepared by reacting polyether polyols and/or polyether polyamines with polyisocyanates. Such polyurethane polymers are described in U.S. Pat. No. 6,248,225.

Epoxide functional groups, for conversion into cationic groups as described above, may be incorporated into the polyurethane by methods well known in the art. For example, epoxide groups can be incorporated by reacting glycidol with free isocyanate groups. Alternatively, hydroxyl groups on the polyurethane can be reacted with an epihalohydrin or dihalohydrin, such as epichlorohydrin or dichlorohydrin, in the presence of alkali.

Sulfonium group-containing polyurethanes can also be made by at least partial reaction of hydroxy-functional sulfide compounds, such as thiodiglycol and thiodipropanol, which results in incorporation of sulfur into the backbone of the polymer. The sulfur-containing polymer is then reacted with a monofunctional epoxy compound in the presence of acid to form the sulfonium group. Appropriate monofunctional epoxy compounds include ethylene oxide, propylene oxide, glycidol, phenylglycidyl ether, and CARDURA® E, available from Resolution Performance Products.

Besides the above-described polyepoxide, vinyl and polyurethane polymers, the active hydrogen-containing, ionic salt group-containing polymer can be derived from a polyester. Such polyesters can be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol. Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Hydroxy acids and their functional equivalents such as dimethylolpropionic acid, caprolactone, hydroxypivalic acid, hydroxystearic acid and the like can also be used in the polyester preparation.

The polyesters typically contain a portion of free hydroxyl groups (resulting from the use of excess polyhydric alcohol and/or higher polyols during preparation of the polyester) which are available for cure reactions. Epoxide functional groups may be incorporated into the polyester by reacting carboxyl groups on the polyester with an epihalohydrin or dihalohydrin such as epichlorohydrin or dichlorohydrin.

Sulfonium salt groups can be introduced by the reaction of an epoxy group-containing polymer of the types described above with a sulfide in the presence of an acid, as described in U.S. Pat. Nos. 3,959,106 and 4,715,898. Sulfonium groups can be introduced onto the polyester backbones described using similar reaction conditions. Further examples of suitable electrodepositable polyester resins are described in U.S. Pat. No. 6,423,774.

Mixtures of the polymers described above may also be used advantageously. In a particular embodiment, the ionic salt group-containing resin (a) comprises one or more polyepoxide polymers and one or more vinyl polymers. Where such mixtures are used, the polyepoxide polymer can be present in the electrodepositable coating compositions in an amount ranging from 10 to 90, typically 20 to 80 weight percent, based on total weight of resin solids present in the composition.

The polymers used in the electrodepositable coating composition of the present invention can have number average molecular weights (Mn) ranging from 1000 to 20,000, often from 1000 to 10,000, and typically from 1000 to 8000, depending on the type of resin used, as determined by gel permeation chromatography using a polystyrene standard.

Generally, the ionic polymer is ungelled and contains from 0.1 to 3.0, preferably from 0.1 to 0.7 millequivalents of ionic salt group per gram of polymer solids.

The active hydrogens associated with the ionic polymer include any active hydrogens which are reactive with isocyanates or aminoplasts within the temperature range of 93° C. to 204° C., usually 121° C. to 180° C. Typically, the active hydrogens are present in the polymer in the form of hydroxyl groups and/or primary or secondary amino groups. Typically, the polymer will have an active hydrogen content of 1.7 to 10 millequivalents, often 2 to 5 millequivalents of active hydrogen per gram of polymer solids.

The ionic salt group-containing resin (a) is typically present in the electrodepositable composition of the present invention in an amount of 10 to 95 percent, often 40 to 80 percent by weight, based on the total weight of the ionic salt group-containing polymer (a) and the curing agent (b).

In one embodiment, the curing agent (b) is reactive with the active hydrogens of (a). Suitable examples of such curing agents include blocked polyisocyanates and aminoplasts.

The curing agents employed in the embodiments comprising cationic electrodepositable compositions of the present invention are typically blocked polyisocyanates. The polyisocyanates can be fully blocked as described in U.S. Pat. No. 3,984,299 column 1, lines 1 to 68; column 2 and column 3, lines 1 to 15; or partially blocked and reacted with the polymer backbone as described in U.S. Pat. No. 3,947,338, column 2, lines 65 to 68; column 3 and column 4, lines 1 to 30, which are incorporated by reference herein. Partially blocked polyisocyanate may alternately be reacted with the active hydrogen groups in the same manner as any of the polymers described above. By "blocked" is meant that the isocyanate groups have been reacted with a compound such that the resultant blocked isocyanate group is stable to active hydrogens at ambient temperature, but reactive with active hydrogens in the film forming polymer at elevated temperatures usually between 90° C. and 200° C. In one embodiment of the present invention, the polyisocyanate curing agent is a fully blocked polyisocyanate with substantially no free isocyanate groups.

Diisocyanates typically are used, although higher polyisocyanates can be used in lieu of or in combination with diisocyanates. The polyisocyanates can be aromatic, araliphatic or aliphatic. Examples of aromatic polyisocyanates suitable for use as curing agents include diisocyanates such as 2,4-toluenediisocyanate, 2,6-toluenediisocyanate, methylene diphenyl diisocyanate, oligomeric methylene diphenyl diisocyanate, and mixtures thereof. Examples of araliphatic and aliphatic polyisocyanates suitable for use as curing agents include polyisocyanates such as 1,6-hexamethylene diisocyanate, isophorone diisocyanate, bis-(isocyanatocyclohexyl) methane, polymeric 1,6-hexamethylene diisocyanate, trimerized isophorone diisocyante, norbornane diisocyanate, tetramethyl xylene diisocyanate and mixtures thereof. In a particular embodiment of the present invention, the curing agent (b) comprises an aromatic blocked polyisocyanate. In an alternative embodiment of the present invention, the curing agent (b) comprises an aliphatic blocked polyisocyanate. Mixtures of aromatic and aliphatic polyisocyanates also can be used.

The curing agents employed in the embodiments comprising anionic electrodepositable compositions of the present invention are typically aminoplasts. Aminoplast resins, which can comprise phenoplasts, are well known in the art. Suitable aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast resin contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

In an alternate embodiment, the curing agent (b) comprises polymerizable vinyl groups. The curing agent typically will have a polymerizable vinyl group functionality of at least two, usually at least three, groups per molecule. Suitable curing agents include but are not limited to polyfunctional vinyl monomers such as those listed in U.S. Published Application No. 2002/0161154, page 4, paragraphs 0052 and 0053. Also suitable are reaction products of glycidyl functional oligomers or polymers with a hydroxyester of (meth)acrylic acid, such as hydroxyethyl(meth)acrylate, hydroxypropyl(meth) acrylate, hydroxybutyl(meth)acrylate, and the like. The reaction produyct of a polyisocyanate with any of the hydroxyesters of (meth)acrylic acid mentioned directly above may also be used. Compounds comprising two or more allyl groups are also suitable as curing agents for the present invention.

In the case of the crosslinkers discussed immediately above, the ionic salt-containing resin (a) may also comprise polymerizable vinyl groups. The vinyl groups may be incorporated by reacting hydroxy-functional acrylic compounds such as those mentioned above, with epoxy or isocyanate groups on the polymeric backbone. Alternatively, polymerizable vinyl groups may be incorporated by copolymerizing hydroxy- or amino-functional compounds comprising vinyl or allyl groups into epoxy, polyurethane, or polyester polymers. If the system is to be cured by ultraviolet radiation, the composition may further comprise any of a number of art-recognized photoinitiators. When included, such initiators are usually present in an amount ranging between 0.1 to 10 parts by weight.

The curing agent (b) is typically present in the electrodepositable composition of the present invention in an amount of 5 to 90 percent, often 20 to 60 percent by weight, based on the total weight of the cationic salt group-containing polymer (a) and the curing agent (b).

The electrodepositable composition of the present invention further comprises one or more metal deactivators (c). For the purposes of the present invention, by metal deactivator is meant a compound that inhibits the photo-oxidative effect of one or more metal ions in an organic coating. In one embodiment, the metal deactivator is capable of complexing metal ions such as iron ions, cobalt ions, copper ions, tin ions, magnesium ions and manganese ions. In a particular embodiment, the metal deactivator is capable of complexing iron ions.

The metal deactivator may further comprise at least one antioxidant group, for example a phenolic hydroxy group.

The metal deactivator, and metal complexes thereof typically are substantially insoluble in water. By "substantially insoluble" is meant that the typical solubility of the metal deactivator is no greater than 5 percent, usually no more than 2 percent in aqueous solution, based on the total amount of metal deactivator present in the electrodepositable coating composition, within the pH range under normal electrodeposition operating conditions. For cationic electrodeposition, pH can range between 4.5 and 7; for anionic electrodeposition, pH can range between 8 and 9, inclusive of the recited values. Typically, the metal deactivator and metal complexes thereof are not removed from an electrodepositable coating composition by ultrafiltration.

Suitable metal deactivators include, but are not limited to, N,N-bis(3,5-di-tert-butyl-4-hydroxyhydrocinnamoyl)hydrazine, 3-(N-salicyloyl)amino-1,2,4-triazole, and 2,2-oxamidobis-ethyl(3,5-di-tert-butyl-4-hydroxyhydrocinnamate), 3,5-bis(1,1-dimethylethyl)-N,4-dihydroxybenzenepropanamide, N,N'-bis[2-[[3-[3,5-bis(1,1-dimethylethyl)-4-hydroxyphenyl]-1-oxopropyl]amino]ethyl]ethanediamide, N,N'-1,6-hexanediylbis[3,5-bis(1,1-dimethylethyl)-4-hydroxybenzenepropanamide], 3,5-bis(1,1-dimethylethyl)-4-hydroxybenzenepropanoic acid-2-[(2-propenylamino) thioxomethyl]hydrazide, N-(2-aminoethyl)-3,5-bis(1,1-dimethylethyl)-4-hydroxybenzenepropanamide, bis[2-[3-[3, 5-bis(1,1-dimethylethyl)-4-hydroxyphenyl]-1-oxopropyl] hydrazide]ethanedioic acid, 3,5-bis(1,1-dimethylethyl)-4-hydroxy-N-(2-hydroxyethyl)benzenepropanamide, 3,5-bis (1,1-dimethylethyl)-4-hydroxybenzenepropanoic acid, 4-[3, 5-bis(1,1-dimethylethyl)-4-hydroxyphenyl]-2-butanone, 3,5-bis(1,1-dimethylethyl)-4-hydroxybenzenepropanoic acid-[[3,5-bis(1,1-dimethylethyl)-4-hydroxyphenyl]methylene]hydrazide.

The metal deactivator can be present in the electrodepositable coating composition in an amount of at least 0.01 weight percent, often at least 0.05 weight percent, and typically at least 0.2 weight percent, based on total weight of resin solids present in the electrodepositable coating composition. Also, the metal deactivator (c) can be present in the composition in an amount of as much as 10 weight percent, often as much as 5 weight percent, and typically as much as 3 weight percent, based on total weight of resin solids present in the electrodepositable coating composition. The amount of metal deactivator (c) present in the electrodepositable coating can range between any combination of these values inclusive of the recited values.

The electrodepositable composition of the present invention may further comprise a hindered amine light stabilizer for added photodegradation resistance, but it is not required. Such hindered amine light stabilizers include, for example, those disclosed in U.S. Pat. No. 5,260,135. Further, nonlimiting examples of suitable hindered amine light stabilizers include those available under the trade names TINUVIN® available from Ciba, and CYASORB® available from Cytec Industries. When used, they are typically present in the electrodepositable composition in an amount of 0.05 to 3 percent by weight, based on the total weight of resin solids in the electrodepositable composition.

Additional light absorbing materials, e.g. UVAs, may also be present in the electrodepositable coating composition of the present invention. These typically remain in the cured film, and may serve to protect the cured coating from photodegradation when the coated article is exposed to ultraviolet light. Any of the UVAs commonly used in the art are appropriate.

The electrodepositable composition of the present invention is typically used in the form of an electrodeposition bath comprising the electrodepositable composition dispersed in an aqueous medium, primarily water. The electrodeposition bath typically has a polymer solids content within the range of 5 to 25 percent by weight based on total weight of the electrodeposition bath.

Besides water, the aqueous medium of the electrodeposition bath may contain a coalescing solvent. Useful coalescing solvents include hydrocarbons, alcohols, esters, ethers and ketones. Typically coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol, propylene glycol and diethylene glycol. The amount of coalescing solvent, when used, is generally less than 15 percent, typically less than 5 percent, and often less than 3 percent by weight, inclusive of the recited values and based on the total weight of the aqueous medium.

A pigment composition and other optional additives such as surfactants, wetting agents, antioxidants, biocides, defoamers or catalysts can be included in the electrodeposition bath. The pigment composition may be of the conventional type comprising inorganic pigments, for example, iron oxides, china clay, carbon black, coal dust, titanium dioxide, talc, barium sulfate, as well as organic color pigments such as phthalocyanine green and the like. The pigment content of the dispersion is usually expressed as a pigment-to-polymer ratio. In the practice of the invention, when pigment is employed, the pigment-to-polymer ratio is usually within the range of 0.02 to 1:1. The other additives mentioned above are usually in the dispersion in amounts of 0.01 to 3 percent by weight based on weight of polymer solids.

Any of the art-recognized curing catalysts can be used. Examples of curing catalysts suitable for use in the electrodepositable compositions of the present invention include, but are not limited to, organotin catalysts, e.g., dibutyltin oxide and dioctyltin oxide, and salts thereof, e.g., dibutyltin diacetate; as well as other metal oxides, for example, oxides of cerium, zirconium and bismuth, and salts thereof, e.g., bismuth sulfamate and bismuth lactate.

Any of the above described electrodepositable compositions of the present invention can further comprise yttrium, bismuth, zirconium, tungsten, neodymium or a rare earth metal as a corrosion inhibiting inorganic component. In one embodiment of the present invention, the electrodepositable coating compositions of the present invention, and the coating composition used in the processes of the present invention are substantially free of heavy metals such as lead.

The electrodepositable coating compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 micron, usually less than 0.5 microns, and typically less than 0.15 micron.

The concentration of the resinous phase in the aqueous medium is at least 1 and usually from 2 to 60 percent by weight based on total weight of the aqueous dispersion. When the compositions of the present invention are in the form of resin concentrates, they generally have a resin solids content of 20 to 60 percent by weight based on weight of the aqueous dispersion.

The curable electrodepositable coating compositions of the invention typically are supplied as two components: (1) a clear resin feed, which includes, generally, active hydrogen-containing, ionic polymer, i.e., the main film-forming polymer, the curing agent, and any additional water-dispersible, non-pigmented components; and (2) a pigment paste, which, generally, includes one or more pigments, a water-dispersible grind resin which can be the same or different from the main-film forming polymer, and, optionally, additives such as catalysts, antioxidants, biocides, defoamers, surfactants, and wetting or dispersing aids. The metal deactivator of the present invention may be present in either the resin feed, pigment paste, or added as a separate component. An electrodeposition bath is prepared by dispersing components (1) and (2) in an aqueous medium which comprises water and, usually, coalescing solvents. Alternatively, the electrodepositable compositions of the present invention can be supplied as one component compositions.

In one embodiment, the present invention is directed to a process for coating an electroconductive substrate. The process comprises: (a) electrophoretically depositing on the substrate any of the curable electrodepositable coatings described in detail above; and (b) heating the coated substrate of step (a) in a curing oven at a temperature and for a time sufficient to cure the electrodeposited coating on the substrate.

In the process of the present invention, the curable electrodepositable coating composition can be electrophoretically deposited onto at least a portion of any of a variety of electroconductive substrates, including various metallic substrates. For example, suitable metallic substrates can include ferrous metals and non-ferrous metals. Suitable ferrous metals include iron, steel, and alloys thereof. Non-limiting examples of useful steel materials include cold-rolled steel, galvanized (i.e., zinc coated) steel, electrogalvanized steel, stainless steel, GALVANNEAL®, pickled steel, GALVALUME®, AND GALVAN® zinc-aluminum alloys coated upon steel, and combinations thereof. Useful non-ferrous metals include conductive carbon coated materials, aluminum, copper, zinc, magnesium and alloys thereof. Cold rolled steel is also suitable when pretreated with a solution such as a metal phosphate solution, an aqueous solution containing at least one Group IIIB or IVB metal, an organophosphate solution, an organophosphonate solution and combinations of the above as are practiced in the art. Combinations or composites of ferrous and non-ferrous metals can also be used.

The electrodeposition process of the present invention typically involves immersing the electroconductive substrate into an electrodeposition bath of an aqueous electrodepositable composition, the substrate serving as a electrode in an electrical circuit comprising the electrode and an oppositely charged counter-electrode. In cationic electrodeposition, the substrate serves as a cathode, whereas the substrate serves as an anode in anionic electrodeposition. Sufficient electrical current is applied between the electrodes to deposit a substantially continuous, adherent film of the electrodepositable coating composition onto the surface of the electroconductive substrate. Electrodeposition is usually carried out at a constant voltage in the range of from 1 volt to several thousand volts, typically between 50 and 500 volts. Maximum current density is usually between 1.0 ampere and 15 amperes per square foot (10.8 to 161.5 amperes per square meter) and tends to decrease quickly during the electrodeposition process, indicating formation of a continuous self-insulating film. The paint bath is typically maintained at a temperature between 70° F. and 100° F. during the electrodeposition process.

In one embodiment, the electrodepositable coating, after being electrodeposited onto a conductive substrate (hereinafter referred to as a "coated ware"), is cured in a curing oven. The curing oven operates at a temperature that is sufficient to cure the coating composition, typically 100-200° C. The coated ware is placed in such a curing oven for a time sufficient to cure the coating composition at the operating temperature.

In an alternate embodiment, the electrodepositable coating compositions comprising polymerizable vinyl groups can be cured using ultraviolet radiation. Irradiation of the deposited composition by ultraviolet radiation hardens the deposited film, crosslinking the polymerizable vinyl groups.

Illustrating the invention are the following examples which, however, are not to be considered as limiting the invention to their details. All parts and percentages in the following examples as well as throughout the specification are by weight unless otherwise indicated.

EXAMPLES

Example 1

This example describes the preparation of a pigment dispersion used in an electrodepositable coating composition (in the form of an electrodeposition bath) with no added metal deactivators.

| Ingredients | Parts by Weight (in grams) |
|---|---|
| Cationic grind vehicle[1] | 4214.2 |
| SURFYNOL ® GA[2] | 87.3 |
| Carbon black pigment[3] | 66.3 |
| Clay[4] | 1123.4 |
| Titanium dioxide[5] | 3880.7 |
| E6278[6] | 1767.3 |
| Deionized water | 1564.9 |

[1]Prepared as described in U.S. Pat. No. 4,715,898, Example 4 with an addition of 0.65% ICOMEEN ® T2, a tallow amine adduct with 2 moles ethylene oxide available from BASF Corporation.
[2]A surfactant available from Air Products, Inc.
[3]CSX ® 333 available from Cabot, Inc.
[4]ASP ® 200 available from Engelhard, Inc.
[5]2310 available from Kronos Worldwide, Inc.
[6]A dibutyltin oxide pigment dispersion available from PPG Industries.

The above ingredients were added in sequence and stirred using a high speed dispersing impeller ("F" type available from Paul Gardner Company, Inc.) until uniform. A Red Head laboratory dispersion mill, commercially available from Chicago Boiler Company, was used for the final dispersion stage. The mill was filled with ceramic grind media and cold tap water was circulated through the unit's cooling jacket. The pigment dispersion was then added to the Red Head dispersion mill and ground for 45 minutes. After grinding, the particle size was reduced to a Hegman of 7.5, as measured using a Hegman fineness of grind gauge commercially available from Paul Gardner Company.

Example 2

This example describes the preparation of a pigment dispersion used in an electrodepositable coating composition (in the form of an electrodeposition bath) with the metal deactivator MDL1®.

| Ingredients | Parts by Weight (in grams) |
| --- | --- |
| Pigment dispersion of Example 1 | 447.5 |
| MDL1[1] | 12.3 |

[1] 2,2-oxamidobis-ethyl(3,5-di-tert butyl-4-hydroxyhydrocinnamate), available from Biddle Sawyer Corporation.

The above ingredients were added in sequence and stirred using a high speed dispersing impeller ("F" type available from Paul Gardner Company, Inc.) until uniform. A Red Head laboratory dispersion mill, commercially available from Chicago Boiler Company, was used for the final dispersion stage. The mill was filled with ceramic grind media and cold tap water was circulated through the unit's cooling jacket. The pigment dispersion was then added to the Red Head dispersion mill and ground for 45 minutes. After grinding, the particle size was reduced to a Hegman of 7.5, as measured using a Hegman fineness of grind gauge commercially available from Paul Gardner Company.

Example 3

This example describes the preparation of a pigment dispersion used in an electrodepositable coating composition (in the form of an electrodeposition bath) with the metal deactivator MD24®.

| Ingredients | Parts by Weight (in grams) |
| --- | --- |
| Pigment dispersion of Example 1 | 559.3 |
| MD241 | 15.7 |

1 N,N-bis(3,5-di-tert-butyl-4 hydroxyhydrocinnamoyl)hydrazine available from Biddle Sawyer Corporation.

The above ingredients were added in sequence and stirred using a high speed dispersing impeller ("F" type available from Paul Gardner Company, Inc.) until uniform. A Red Head laboratory dispersion mill, commercially available from Chicago Boiler Company, was used for the final dispersion stage. The mill was filled with ceramic grind media and cold tap water was circulated through the unit's cooling jacket. The pigment dispersion was then added to the Red Head dispersion mill and ground for 45 minutes. After grinding, the particle size was reduced to a Hegman of 7.5, as measured using a Hegman fineness of grind gauge commercially available from Paul Gardner Company.

Example 4

This example describes the preparation of a pigment dispersion used in an electrodepositable coating composition (in the form of an electrodeposition bath) that has the same shear history as the pastes in Examples 2 and 3.

| Ingredients | Parts by Weight (in grams) |
| --- | --- |
| Pigment dispersion of Example 1 | 2400 |

A Red Head laboratory dispersion mill, commercially available from Chicago Boiler Company, was filled with ceramic grind media and cold tap water was circulated through the unit's cooling jacket. The pigment dispersion of Example 1 was then added to the dispersion mill and ground for 45 minutes.

Example 5

This example describes the preparation of a cationic amine salt group-containing acrylic resin having a blocked aliphatic polyisocyante curing agent mixed with the polymer. The cationic acrylic polymer was prepared as described below from the following ingredients:

| Ingredients | Parts by Weight (in grams) |
| --- | --- |
| Methylisobutyl ketone | 309.3 |
| Ethyl Acrylate | 681.3 |
| Styrene | 521.5 |
| Hydroxypropyl methacrylate | 168.2 |
| Methyl methacrylate | 58.9 |
| Glycidyl methacrylate | 252.4 |
| t-Dodecyl mercaptan | 8.4 |
| VAZO ® 67[1] | 42.0 |
| DOWANOL ® PM[2] | 26.9 |
| DOWANOL ® PNB[3] | 53.8 |
| Methylisobutyl ketone | 21.8 |
| LUPERSOL ® 75M[4] | 33.7 |
| DOWANOL PNB | 26.9 |
| Methylisobutyl ketone | 13.4 |
| Diethanolamine | 151.4 |
| Diketimine of Example A | 126.8 |
| Crosslinker[5] | 1871.8 |
| Sulfamic acid | 105.4 |
| Deionized Water | 9545.3 |

[1] A radical initiator, available from DuPont Specialty Chemicals.
[2] Propylene glycol monomethyl ether solvent available from Dow Chemical.
[3] N-Butoxypropanol solvent available from Dow Chemical.
[4] A radical initiator, available from Atofina Chemicals, Inc.
[5] Crosslinker prepared by reacting ten equivalents of isophorone diisocyanate, one equivalent of trimethylol propane, three equivalents of ethoxylated bisphenol A and six equivalents of 1,2-butanediol.

The first charge of methylisobutyl ketone ingredient was charged into a suitably equipped reaction vessel under a nitrogen atmosphere and heated to reflux at which time the next ten ingredients were added to the vessel at a uniform rate over a period of 2.5 hours. When the addition was complete, the reaction mixture was held for an additional 10 minutes at a reflux. The reaction mixture then was maintained at reflux during addition of the next three ingredients, which were added together over a period of 10 to 15 minutes, following which reflux was maintained for 60 minutes. The reaction mixture was cooled to room temperature overnight. The next day, The reaction mixture was heated to reflux under a nitrogen blanket at which time diethanolamine was added and this mixture was maintained at reflux for 90 minutes. The diketimine was then added and the resultant reaction mixture was maintained at reflux for an additional one-hour period. The crosslinker was added and the reaction mixture was maintained at 105° C. for 60 minutes. The last two ingredients were mixed separately and heated to a temperature of 50° C. To this, 94% of the polymer solution was added under agitation to produce a dispersion of the organic polymer in an aqueous medium having a weight solids of 25 percent. Final distillation under reduced pressure to remove methylisobutyl ketone yielded a dispersion having 29.73 percent solids by weight.

Example 6

This example describes the preparation of a cationic amine salt group-containing polyepoxide resin having a blocked aliphatic polyisocyanate curing agent mixed with the polymer. The cationic polyepoxide resin was prepared as described below from the following ingredients:

| Ingredients | Parts by Weight (in grams) |
| --- | --- |
| EPON ® 880[1] | 1967.4 |
| Bisphenol A-ethylene oxide adduct[2] | 400.1 |
| Bisphenol A | 849.6 |
| Methylisobutyl ketone | 30.5 |
| Ethyltriphenylphosphonium iodide | 1.9 |
| Bisphenol A-ethylene oxide adduct[2] | 400.1 |
| Methylisobutyl ketone | 56.0 |
| Crosslinker[3] | 3961.5 |
| Methylisobutyl ketone | 83.0 |
| Diethanolamine | 188.5 |
| Diketimine[4] | 288.1 |
| EPON 880 | 73.3 |

[1]Diglycidyl ether of bisphenol A having an epoxy equivalent weight of 188, available from Resolution Performance Products.
[2]Reaction product prepared from bisphenol A and ethylene oxide at a molar ratio of 1:6 (100% solids).
[3]Prepared by reacting 10 equivalents of DESMODUR ® N 3300 (polyfunctional hexamethylene diisocyanate available from Bayer Corp.) with 5 equivalents of benzyl alcohol and 5 equivalents of 1,2-bytanediol, using dibutyltin dilaurate as catalyst (87% solids in methylisobutyl ketone).
[4]Reaction product of diethylenetriamine and methylisobutyl ketone (73% solids in methylisobutyl ketone).

The first four ingredients were charged to a suitably equipped reaction vessel and heated under a nitrogen atmosphere to a temperature of 125° C. Ethyltriphenylphosphonium iodide was then added and the reaction mixture was allowed to exotherm to a temperature of 145° C. The reaction mixture was maintained at that temperature for a period of 2 hours at which time the second charge of bisphenol A-ethylene oxide adduct was added and an epoxy equivalent was obtained. The second charge of methylisobutyl ketone, crosslinker, methylisobutyl ketone and diethanolamine were then added sequentially. The resulting reaction mixture was allowed to exotherm and a temperature of 122° C. was established. This reaction mixture was maintained at this temperature for a period of 30 minutes at which time the diketimine was added and the resulting reaction mixture was maintained at 122° C. for 30 additional minutes. EPON 880 then was added and the mixture held for 60 minutes. An aqueous dispersion was prepared by adding 8000 parts by weight of the reaction mixture to a mixture of 116.41 parts by weight sulfamic acid, 68.53 parts by weight 50% aqueous solution of lactic acid and 5068 parts by weight of deionized water. The mixture was diluted with 5929 parts by weight deionized water (water added in two stages), then vacuum stripped to remove organic solvent. The resultant product had a solids content of 38.3 percent (1 hour at 110° C.).

Example 7

This example describes an electrodepositable coating composition that contains no metal deactivators or added soluble iron salts.

| Ingredients | Parts by Weight (in grams) |
| --- | --- |
| Premix 1: | |
| Co-resin 1[1] | 89.6 |
| MAZON ® 1651[2] | 12.5 |
| Premix 2: | |
| Acrylic resin of Example 5 | 1033.8 |
| Epoxy resin of Example 6 | 720.6 |
| Pigment dispersion of Example 4 | 223.7 |
| Deionized water | 1725.3 |

[1]Material as described in US patent 4,420,574 example P with the following changes: Co-resin 1 is neutralized with Sulfamic acid replacing acetic acid, and the material contains 2.46% MAZON 1651. Overall co-resin 1 was 35% nonvolatile.
[2]A plasticizer, commercially available from BASF Corporation Premix 1 was made by adding MAZON 1651 to co-resin 1 and stirring until uniform and thick. Premix 2 was made by adding the acrylic resin of Example 5 to a gallon container, then adding the epoxy resin of Example 6 under agitation. Premix 1 was then added to premix 2 under agitation and allowed to stir until uniform. The pigment dispersion of Example 4 was then added under agitation. The resulting paint was then reduced to 20% solids by the addition of the deionized water.

The paint was allowed to stir 24 hours, then ultrafiltered 25% by weight. The ultrafiltrate removed from the paint was replaced with an equal weight of deionized water.

Example 8

This example describes an electrodepositable coating composition that contained MD24 metal deactivator and 10 ppm soluble iron.

| Ingredients | Parts by Weight (in grams) |
| --- | --- |
| Premix 1: | |
| Co-resin 1 described in Example 7 | 89.6 |
| MAZON 1651 | 12.5 |
| Premix 2: | |
| Acrylic resin of Example 5 (at 29.89% solids) | 1017.7 |
| Epoxy resin of Example 6 | 712.4 |
| Pigment dispersion of Example 3 | 230.0 |
| Deionized water | 1737.7 |

Premix 1 was made by adding MAZON 1651 to Co-resin 1 and stirring until uniform and thick. Premix 2 was made by adding the acrylic resin of Example 5 to a gallon container, then adding the epoxy resin of Example 6 under agitation. Premix 1 was then added to Premix 2 under agitation and allowed to stir until uniform. The pigment dispersion of Example 3 was then added under agitation. The resulting paint was then reduced to 20% solids by the addition of the deionized water.

The paint was allowed to stir 24 hours, then ultrafiltered 25% by weight. The ultrafiltrate removed from the paint was replaced with an equal weight of deionized water. To this paint was added 12.46 g of a 1% (by weight) solution of iron(2) acetate (95% pure) to give 10 ppm added iron cations in the paint.

Example 9

This example describes the preparation and deposition of an electrodepositable coating composition that contained MDL1 metal deactivator and 10 ppm soluble iron.

| Ingredients | Parts by Weight (in grams) |
| --- | --- |
| Premix 1: | |
| Co-resin 1 described in Example 7 | 89.6 |
| MAZON 1651 | 12.5 |
| Premix 2: | |
| Acrylic resin of Example 5 (at 29.89% Solids) | 1017.7 |
| Epoxy resin of Example 6 | 712.4 |
| Pigment dispersion of Example 2 | 230.0 |
| Deionized water | 1737.7 |

Premix 1 was made by adding MAZON 1651 to Co-resin 1 and stirring until uniform and thick. Premix 2 was made by adding the acrylic resin of Example 5 to a gallon container, then adding the epoxy resin of Example 6 under agitation. Premix 1 was then added to premix 2 under agitation and allowed to stir until uniform. The pigment dispersion of Example 2 was then added under agitation. The resulting paint was then reduced to 20% solids by the addition of the deionized water.

The paint was allowed to stir 24 hours, then ultrafiltered 25% by weight. The ultrafiltrate removed from the paint was replaced with an equal weight of deionized water. To this paint was added 12.46 g of a 1% (by weight) solution of iron(2) acetate (95% pure) to give 10 ppm added iron cations in the paint.

Example 10

This example describes an electrodepositable coating composition that contains no metal deactivators and with 10 ppm soluble iron salts.

| Ingredients | Parts by Weight (in grams) |
| --- | --- |
| Premix 1: | |
| Co-resin 1 described in Example 7 | 89.6 |
| MAZON 1651 | 12.5 |
| Premix 2: | |
| Acrylic Resin of Example 5 | 1033.8 |
| Epoxy Resin of Example 6 | 720.6 |
| Pigment dispersion of Example 4 | 223.7 |
| Deionized water | 1725.3 |

Premix 1 was made by adding MAZON 1651 to co-resin 1 and stirring until uniform and thick. Premix 2 was made by adding the acrylic resin of Example 5 to a gallon container, then adding the epoxy resin of Example 6 under agitation. Premix 1 was then added to premix 2 under agitation and allowed to stir until uniform. The pigment dispersion of Example 4 was then added under agitation. The resulting paint was then reduced to 20% solids by the addition of the deionized water.

The paint was allowed to stir 24 hours, then ultrafiltered 25% by weight. The ultrafiltrate removed from the paint was replaced with an equal weight of deionized water. To this paint was added 12.46 g of a 1% (by weight) solution of iron(2) acetate (95% pure) to give 10 ppm added iron cations in the paint.

Preparation of Test Panels

Each of the electrodepositable coating compositions of Examples 7 through 10 was deposited as described below onto 4"×12" zinc-phosphated galvanized steel test panels commercially available from ACT Laboratories, Inc. as APR31611 (E60 EZG 60G two-sided with C700 DI phosphate and rinse). Panels were coated by applying a potential between the cathode (the panel) and a stainless steel anode under conditions necessary to form a substantially continuous film having a dry film thickness of between 25.4 and 28 microns. The ranges for adjustment were: temperature 92±2° F., voltage 220±20 volts, and time between 2 and 4 minutes. The electrocoated panels were then thermally cured at 395° F. (202° C.) for 60 minutes in a gas-fired oven.

Each of the test panels coated as described above were topcoated with a solvent-based unpigmented base/clear top coat system which was designed to permit 80% light transmission measured at 400 nm wavelength. The base coat composition is as follows:

| Ingredients | Parts by Weight (in grams) |
| --- | --- |
| Methyl ethyl ketone | 94.1 |
| Xylene | 280.4 |
| Diisobutyl ketone | 490.7 |
| Amyl alcohol | 80.7 |
| TINUVIN ® 328[1] | 60.5 |
| Microgel[2] | 458.1 |
| RESIMENE ® 755[3] | 1008.3 |
| Polyester resin[4] | 100.8 |
| Acrylic resin[5] | 1038.1 |

-continued

| Ingredients | Parts by Weight (in grams) |
|---|---|
| Methanol | 121.1 |
| Blocked acid catalyst[6] | 67.2 |

[1]Ultraviolet light absorber available from Ciba Specialty Chemicals
[2]Prepared as described in U.S. Pat. No. 4,147,688, Example II
[3]A melamine-formaldehyde crosslinker available from Solutia Inc.
[4]Condensation reaction product of a $C_{36}$ dibasic acid (59.1% of reactant solids) and neopentyl glycol (16.9% of reactant solids), cyclohexane dimethanol (17.5% of reactant solids), and trimethylol propane (6.5% of reactant solids)(100% total solids).
[5]Hydroxy functional acrylic resin (18.5% n-butyl methacrylate/40 hydroxypropyl acrylate/0.5% methyl methacrylate/20% styrene/19% n-butyl acrylate/2% acrylic acid), 68.8% solids in a mixture of acetone, Aromatic 100 and amyl acetate.
[6]Diisopropyl Amine neutralized dodecylbenzene sulfonic acid The base coat composition was spray applied to each of the electrocoated test panels to yield a base coat dry film thickness of about 0.35 mils (8.89 micrometers). The applied base coat was given a one minute flash period. A solvent-based clear coat, DCT1002B (available from PPG Industries) was then spray-applied to the base coat to give a dry clear coat film thickness of 1.6 to 1.8 mils (40.64 to 45.72 micrometers). The test panels were then thermally cured at a temperature of 250° F. for 30 minutes.

Light transmission of the base coat/clear coat system was determined using cured free films applied at the dry film thickness described above using a Perkin-Elmer Lambda 9 scanning spectrophotometer with a 150 mm Lab Sphere integrating sphere. Data collection was accomplished with Perkin-Elmer UV WinLab software in accordance with ASTM E903.

Photodegradation Resistance Testing

Photodegradation resistance was evaluated in accordance with ASTM G90-98 using EMMAQUA NTW®, available through Atlas Weather Services, Inc., DSET Laboratories of Phoenix, Ariz. The test panels were cooled by forced air convection to limit the increase in surface temperatures of the specimens to 10° C. above the maximum surface temperature when identically mounted specimens are exposed to direct sunlight at normal incidence at the same time and location without concentration. Exposure is reported as the total integrated ultraviolet radiation ranging between wavelengths of 295 and 385 nanometers.

For each electrodepositable composition prepared as described above, eight panels (1"×6") were tested using the above method. One panel corresponding to each of the electrocoat paints of Examples 7 through 10 was removed from exposure at the following total energy accumulation indicated in the table below:

| Panel Return # | Exposure Energies ($MJ/m^2$) |
|---|---|
| 1 | 44.6 |
| 2 | 89.2 |
| 3 | 145 |
| 4 | 217.5 |
| 5 | 290 |
| 6 | 580 |
| 7 | 870 |
| 8 | 1060 |

Photodegradation resistance of the cured electrodeposited coating was evaluated by crosshatch adhesion testing of the exposed test panels at each of the aforementioned exposure energies. Adhesion testing was also conducted after each of the test panels had been exposed for 16 hours at 100% relative humidity at 100° F. Crosshatch adhesion testing was done in accordance with ASTM D3359-97, using a rating scale ranging from 0 to 10, where 10=best, and using a 2 millimeter crosshatch tool (Model PA-2056 from BYK Gardner). Adhesion results for the electrodeposited paints of Examples 7 through 10 are reported in Table 1 below:

TABLE 1 following various EMMAQUA exposures.

EMMAQUA UV energy exposure ($MJ/m^2$)

Crosshatch adhesion ratings

| Electrocoat Example # | Metal Deactivator | Soluble Iron (ppm) | 0 Initial | 0 Post Humidity | 44.6 Initial | 44.6 Post-Humidity | 89.2 Initial | 89.2 Post-humidity | 145 Initial | 145 Post-humidity | 217.5 Initial | 217.5 Post-humidity | 290 Initial | 290 Post-humidity |
|---|---|---|---|---|---|---|---|---|---|---|---|---|---|---|
| 7 | none | 0 | 10.0 | 10.0 | 10.0 | 10.0 | 10.0 | 10.0 | 10.0 | 0.0 | 10.0 | 0.0 | 10.0 | 0.0 |
| 8 | MD-24 | 10 | 10.0 | 10.0 | 10.0 | 8.0 | 10.0 | 10.0 | 10.0 | 9.0 | 10.0 | 0.0 | 10.0 | 0.0 |
| 9 | MDL1 | 10 | 10.0 | 10.0 | 10.0 | 10.0 | 10.0 | 10.0 | 10.0 | 1.0 | 10.0 | 0.0 | 10.0 | 1.0 |
| 10 | none | 10 | 10.0 | 10.0 | 9.0 | 10.0 | 10.0 | 7.0 | 10.0 | 1.0 | 9.0 | 0.0 | 8.0 | 0.0 |

"Post-humidity" = after 16 hours at 100° F., 100% humidity

As illustrated in Table 1, in iron-containing compositions the presence of the metal deactivators MD L1 or MD 24 (Examples 8 and 9) maintained a higher level of resistance to photodegradation than coating compositions with no metal deactorator present (Example 10), as measured by crosshatch adhesion. The coating of Example 10, which had no metal deactivator and 10 ppm iron, exhibited measurable loss of performance at 89.2 MJ/m2, while those of Examples 8 and 9 performed similarly to Example 7 which contained no iron or metal deactivator.

Degradation Value Testing

Degradation value testing was done by ultra-low-angle cross-sectional microtoming (ULACSM) of the composite structure to obtain a sample, e.g., electrocoat+unpigmented base coat (described above)+DCT1002B clearcoat. A general description of low-angle microtome technique is described in "Ultra-low-angle Cross-sectional Microtoming Technique for the Chemical Characterization of Bonding Interfaces in Layered Polymeric Systems" presented at the 25th Annual Adhesive Society Meeting (2002) and incorporated herein by reference.

The coated article is placed on an angled base and a section of the composite structure is removed by the blade of a conventional low-angle microtome. One suitable microtome is a model SM2500E heavy-duty sliding microtome manufactured by Leica Microsystems. The angle of the composite structure relative to the microtome blade (microtoming angle) is set sufficiently low to provide wide samples of the electrocoat and basecoat interfaces. For this work, a microtome angle of 0.2° was used. The thickness of the microtome slice examined was 6 microns.

Upon removal of the microtomed section ("sample"), the sample can be analyzed using conventional analytical techniques. In this work, the microtomed samples were examined using infrared microscopy to examine the electrocoat layer at the basecoat-electrocoat interface. A degradation value (DV) was determined by the following procedure: First, an infrared spectrum was taken at the basecoat-electrocoat interface of each sample. From this, the OH, NH, and CH peak areas of the spectrum were integrated and the ratio of OH:NH:CH areas were calculated. This was repeated for coated articles exposed to a known amount of EMMAQUA NTW exposure. The initial value for this ratio, taken from an unexposed panel (t=0), was subtracted from the value obtained from a sample at a predetermined exposure energy (t=x), as shown in equation 1 below:

$$DV = \left[\frac{OH, NH}{CH}\right]_{t=x} - \left[\frac{OH, NH}{CH}\right]_{t=0} \quad \text{EQUATION 1}$$

The difference between the initial value and the value at known exposure energy is defined as the degradation value (DV). This method quantifies the amount of photooxidation damage a coating layer has received, corresponding to increased OH and NH functionality. Lower DV numbers indicate less photooxidative damage of the sample.

DV numbers for coating compositions exposed to 290 MJ/m2 EMMAQUA NTW are reported in Table 2 below. Each of the coatings of Examples 7 through 10 were prepared with top coat and clear coat as described above before testing.

TABLE 2

| Example # | Metal Deactivator | Iron Level (ppm) | DV |
|---|---|---|---|
| 8 | MD 24 | 10 | 0.56 |
| 9 | MD L1 | 10 | 0.84 |
| 10 | none | 10 | 1.48 |
| 7 | none | 0 | 0.55 |

The degradation values in Table 2 show the same trend as was illustrated by crosshatch adhesion results in Table 1. That is, in the presence of iron ions, coating systems containing at least one metal deactivator are less susceptible to photodegradation (lower DV) than a similar coating containing no metal deactivator.

It will be appreciated by those skilled in the ail that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore we claim:

1. A curable electrodepositable coating composition comprising a resinous phase dispersed in an aqueous medium, said resinous phase comprising:
   (a) one or more ungelled, active hydrogen-containing ionic salt group-containing resins which are electrodepositable on an electrode;
   (b) one or more curing agents; and
   (c) one or more metal deactivators.

2. The composition of claim 1, wherein said active hydrogen-containing resin (a) comprises at least one polymer selected from a polyepoxide polymer, a polyester polymer, a urethane polymer, a polyether polymer, a polyurea polymer, a vinyl polymer, a polyamide polymer, a polyimide polymer, mixtures thereof and copolymers thereof.

3. The composition of claim 1, wherein said curing agent (b) is reactive with the active hydrogens of (a).

4. The composition of claim 3, wherein said curing agent (b) is selected from at least one of blocked isocyanates and aminoplasts.

5. The composition of claim 1, wherein said curing agent (b) comprises polymerizable vinyl groups.

6. The composition of claim 5, wherein said active hydrogen-containing resin (a) comprises polymerizable vinyl groups.

7. The composition of claim 1, wherein the resin (a) is present in the electrodepositable coating composition in an amount ranging from 10 to 95 weight percent, based on total weight of resin solids present in the electrodepositable coating composition.

8. The composition of claim 1, wherein the curing agent (b) is present in the electrodepositable coating composition in an amount ranging from 5 to 90 percent, based on total weight of resin solids present in the electrodepositable coating composition.

9. The composition of claim 1, wherein said active hydrogen-containing resin (a) comprises cationic salt groups.

10. The composition of claim 9, wherein the cationic salt groups of (a) are selected from at least one of amine salt groups, quaternary ammonium groups, and sulfonium groups.

11. The composition of claim 9, wherein said curing agent (b) comprises one or more at feast partially blocked isocyanates.

12. The composition of claim 9, wherein said active hydrogen containing resin (a) comprises one or more polyepoxide polymers.

13. The composition of claim 1, wherein said active hydrogen-containing resin (a) comprises one or more vinyl polymers.

14. The composition of claim 9, wherein said active hydrogen-containing resin (a) comprises one or more polyepoxide polymers and one or more vinyl polymers.

15. The composition of claim 1, wherein said active hydrogen-containing resin (a) comprises anionic salt groups.

16. The composition of claim 15, wherein said curing agent (b) comprises one or more aminoplasts.

17. The composition of claim 1, wherein said metal deactivator (c) is capable of complexing metal ions.

18. The composition of claim 17, wherein said metal ions are selected from at least one of iron ions, cobalt ions, copper ions, tin ions, magnesium ions and manganese ions.

19. The composition of claim 18, wherein said metal deactivator (c) is capable of complexing iron ions.

20. The composition of claim 17, wherein said metal deactivator (c) comprises at least one antioxidant group.

21. The composition of claim 20, wherein said antioxidant group is a phenolic hydroxyl group.

22. The composition of claim 1, wherein said metal deactivator (c) is substantially insoluble in water.

23. The composition of claim 17, wherein said metal deactivator (c) is selected from at least one of N,N-bis(3,5-di-tert-butyl-4-hydroxyhydrocinnamoyl)hydrazine and 2,2-oxamidobis-ethyl(3,5-di-tert-butyl-4-hydroxyhydrocinnamate).

24. The composition of claim 1, wherein said metal deactivator (c) is present in said electrodepositable coating composition in an amount ranging from 0.01 to 10 percent based on total weight of resin solids present in the electrodepositable coating composition.

25. The composition of claim 1, wherein said metal deactivator (c) is present in said electrodepositable coating composition in an amount ranging from 0.05 to 3 percent based on total weight of resin solids present in the electrodepositable coating composition.

26. The composition of claim 1, further comprising a hindered amine light stabilizer.

27. The composition of claim 26, wherein said hindered amine light stabilizer is present in said electrodepositable coating composition in an amount ranging from 0.05 to 3 weight percent, based on the total weight of resin solids present in the electrodepositable coating composition.

28. A process for coating an electroconductive substrate comprising:
   (a) electrophoretically depositing on the substrate a curable electrodepositable coating composition to form an electrodeposited coating over at least a portion of the substrate, the electrodepositable coating composition comprising a resinous phase dispersed in an aqueous medium, said resinous phase comprising:
      (i) one or more ungelled, active hydrogen-containing ionic salt group-containing resins which are electrodepositable on an electrode;
      (ii) one or more curing agents;
      (iii) one or more metal deactivators; and
   (b) curing the coated substrate.

29. The process of claim 28, wherein the curing step (b) comprises heating the coated substrate to a temperature and for a time sufficient to cure the electrodeposited coating on the substrate.

30. The process of claim 28, wherein said active hydrogen-containing resin (i) comprises at least one polymer selected from a polyepoxide polymer, an acrylic polymer, a polyester polymer, a urethane polymer, a polyether polymer, a polyurea polymer, a vinyl polymer, a polyamide polymer, a polyimide polymer, mixtures thereof and copolymers thereof.

31. The process of claim 28, wherein said curing agent (ii) is reactive with the active hydrogens of (i).

32. The process of claim 31 wherein said curing agent (ii) is selected from at least one of blocked isocyanates and aminoplasts.

33. The process of claim 28, wherein the resin (i) is present in the electrodepositable coating composition in an amount ranging from 10 to 95 weight percent, based on total weight of resin solids present in the electrodepositable coating composition.

34. The process of claim 28, wherein said curing agent (ii) comprises polymerizable vinyl groups.

35. The process of claim 34, wherein the curing step (b) comprises exposing the coated substrate to ultraviolet radiation sufficient to cure the electrodeposited coating on the substrate.

36. The process of claim 34, wherein said active hydrogen-containing resin (i) comprises polymerizable vinyl groups.

37. The process of claim 28, wherein the curing agent (ii) is present in the electrodepositable coating composition in an amount ranging from 5 to 90 percent, based on total weight of resin solids present in the electrodepositable coating composition.

38. The process of claim 28, wherein said active hydrogen-containing resin (i) comprises cationic salt groups.

39. The process of claim 38, wherein the cationic salt groups of (i) are selected from at least one of amine salt groups, quaternary ammonium groups, and sulfonium groups.

40. The process of claim 38, wherein said curing agent (ii) comprises one or more at least partially blocked isocyanates.

41. The process of claim 38, wherein said active hydrogen-containing resin (i) comprises one or more polyepoxide polymers.

42. The process of claim 28, wherein said active hydrogen-containing resin (i) comprises one or more vinyl polymers.

43. The process of claim 38, wherein said active hydrogen-containing resin (i) comprises one or more polyepoxide polymers and one or more vinyl polymers.

44. The process of claim 28, wherein said active hydrogen-containing resin (i) comprises anionic salt groups.

45. The process of claim 44, wherein said curing agent (ii) comprises one or more aminoplasts.

46. The process of claim 28, wherein said metal deactivator (iii) is capable of complexing metal ions.

47. The process of claim 46, wherein said metal ions are selected from at least one of iron ions, cobalt ions, copper ions, tin ions, magnesium ions, and manganese ions.

48. The process of claim 41, wherein said metal deactivator (iii) is capable of complexing iron ions.

49. The process of claim 46, wherein said metal deactivator (iii) comprises at least one antioxidant group.

50. The process of claim 49, wherein said antioxidant group is a phenolic hydroxyl group.

51. The process of claim 46, wherein said metal deactivator (iii) is selected from at least one of N,N-bis(3,5-di-tert-butyl-4-hydroxyhydrocinnamoyl)hydrazine and 2,2-oxamidobis-ethyl(3,5-di-tert-butyl-4-hydroxyhydrocinnamate).

52. The process of claim 28, wherein said metal deactivator (iii) is substantially insoluble in water.

53. The process of claim 28, wherein said metal deactivator (iii) is present in said electrodepositable coating composition in an amount ranging from 0.01 to 10 percent based on total weight of resin solids present in the electrodepositable coating composition.

54. The process of claim 28, wherein said metal deactivator (iii) is present in said electrodepositable coating composition in an amount ranging from 0.05 to 3 percent based on total weight of resin solids present in the electrodepositable coating composition.

55. The process of claim 28, further comprising a hindered amine light stabilizer.

56. The process of claim 55, wherein said hindered amine light stabilizer is present in said electrodepositable coating composition in an amount ranging from 0.05 to 3 weight percent, based on the total weight of resin solids present in the electrodepostiable coating composition.

* * * * *